| | 1 | 2 | 3 | 4 |
|---|---|---|---|---|
| LINE A | RAW | △ | △ | △ |
| LINE B | △ | RAW | △ | △ |
| LINE C | △ | △ | RAW | △ |
| LINE D | △ | △ | △ | RAW |
| LINE E | RAW | △ | △ | △ |

INVENTOR.
ARTHUR T. STARR
PETER J. GREAVES
PETER F. T.C. STILLWELL
BY Anthony D. Cennamo
ATTORNEY INVENTOR.
ARTHUR T. STARR
PETER J. GREAVES
BY PETER F. T. C. STILLWELL
Anthony D. Cennamo
ATTORNEY INVENTOR.
ARTHUR T. STARR
PETER J. GREAVES
BY PETER F. T. C. STILLWELL
Anthony D. Cennamo
ATTORNEY Aug. 18, 1970 A. T. STARR ET AL 3,524,926

SYSTEM FOR DELTA ENCODING AT SELECTED INTERVALS

Filed Aug. 10, 1966 4 Sheets-Sheet 4

INVENTOR.
ARTHUR T. STARR
PETER J. GREAVES
BY PETER F. T.C. STILLWELL

Anthony D. Cennamo
ATTORNEY

United States Patent Office 3,524,926
Patented Aug. 18, 1970

3,524,926

SYSTEM FOR DELTA ENCODING AT SELECTED INTERVALS

Arthur T. Starr, New Barnet, Peter James Greaves, Harrow, and Peter F. T. C. Stillwell, Aldershot, England, assignors to Xerox Corporation, Rochester, N.Y., a corporation of New York Filed Aug. 10, 1966, Ser. No. 571,507
Claims priority, application Great Britain, June 15, 1966, 26,808/66
Int. Cl. H04n 7/12
U.S. Cl. 178—6 4 Claims

ABSTRACT OF THE DISCLOSURE

A modified delta encoding technique for periodically purging streaking errors and reducing the number of binary digits required to represent a given message in a graphic communication system. Apparatus is disclosed which compares a second line of data with a first line and just the difference therebetween is transmitted. In a first embodiment every Nth line is transmitted without modification by the delta encoding apparatus. A second embodiment arbitrarily divides the line into N segments and send raw data for successive N segments of subsequent scan lines. These embodiments limit the noise propagation to the maximum of N lines of information.

This invention relates to graphic communication systems and, more particularly, to methods and apparatus for efficiently utilizing the bandwidth capabilities of transmission networks interconnecting the transmitter and receiver of such systems.

As is known in a normal facsimile system, a document to be transmitted is scanned at a transmitting station to convert information on the document into a series of electrical signals. These video signals or carrier modulated signals corresponding thereto are then coupled to the input of a communication link interconnecting the transmitter with a receiver. At the receiving station, the video signals, in conjunction with suitable synchronizing signals, selectively control the actuation of appropriate marking means to generate a facsimile of the document transmitted.

A principal application of facsimile equipment is the transmission of printed or typewritten documents and letters. It is a distinguishing characteristic of such original documents that printing or typing is arranged in substantially horizontal lines. Examination of a typical letter, for example, will show that lines of typing actually occupy considerably less than half the vertical dimension of the letter, the rest of its dimension being blank and corresponding to spaces between lines as well as blank spaces at the top and bottom of the letter. In a conventional facsimile system, all parts of such letter are normally scanned at a uniform rate. Assuming transmission over an ordinary telephone line, it may take in the order of six to fifteen minutes to transmit an ordinary letter with reasonable resolution. Considering the cost of the telephone service, such a long transmission time becomes a serious limitation on the economic usefulness of facsimile equipment.

The signal redundancy inherent in facsimile signals due, for example, to the margins and spacing between paragraphs of a letter and the attendant increased transmission cost, have led to the development of various coding techniques to reduce such redundancy, thereby eliminating the wasted transmission time. One such coding technique is known as run length coding in which binary numbers corresponding to various blocks of video data are sent rather than the usual facsimile signals. In such a system, a binary number of relatively few bits may be sent in lieu of a larger block of video data.

Such encoding techniques, while significantly reducing the number of bits which must be sent and thereby reducing the transmission time, have not been entirely satisfactory. In a normal facsimile system, the scanning of a document may be made at, for example, 135 lines per inch. Because of the close proximity of successive scans, the binary bit signal positions from one scan line would not vary widely with the binary bit positions from the next scan line. This is due to the fact that for typescript information, for example, the height of a letter may encompass several scan lines with no difference in resultant information. One prior art solution to the situation that successive scanned lines contain similar information is to detect and count the number of changes in the data from successive scans and only the difference between the two lines is transmitted. This method is known in the art as the delta encoding technique.

While the delta encoding technique increases the length of the white runs, as similar black information has been subtracted out, a major shortcoming in the technique involves the propagation of errors transmitted throughout the entire length of a document. If, for example, by means of noise or scanning errors, black information was detected as white, or white information was detected as black, the system would assume that such information was correct and the next line compared to it would not see the correct information bit. Thus, a single error would probably be propagated throughout the entire length of the document, causing black or white streaking. Such a condition is highly undesirable in that the resultant copy at a facsimile receiver would be streaked increasingly down the page as the noise errors are propagated, thus decreasing the usefulness and the appearance of the document.

It is, accordingly, an object of the present invention to provide methods and apparatus for efficiently utilizing the bandwidth capabilities of graphic communication and transmission systems.

It is another object of the present invention to optimize the information handling capability of transmission networks in graphic communication systems.

It is another object of the present invention to provide methods and apparatus for periodically purging streaking errors and reducing the number of bits required to represent a given message in a graphic communication system.

It is still another object of the present invention to provide an improved delta encoding technique for use in a graphic communication system.

In accomplishing the above and other desired aspects, applicant has invented novel methods and apparatus for limiting the effects of transmission signal errors in a facsimile system. There is disclosed a novel selective delta encoding technique wherein raw facsimile information is selectively transmitted between periods of delta encoded information. The effects of signal errors is eliminated by selectively transmitting portions of the information signal as unmodified information. The output from the delta encoder is coupled to the input of a binary encoder to encode the redundancy in the information signal waveform. Such information is then transmitted to a facsimile receiver wherein the binary encoded information is decompressed in a decoder to reconstitute the binary signal waveform. Such information is then decoded in the delta decoder to reconstruct the original signal waveform emanating from the facsimile transmitter. The output from the delta decoder is coupled to the input of a facsimile printer wherein a facsimile of the original document is printed.

In accordance with a first embodiment of the invention, the delta encoder would selectively pass every Nth line from the facsimile transmitter directly to the binary encoder. Such scan information between successive Nth lines would be coded in the delta encoder so as to increase the length of the white information runs. Allowing every Nth line to pass without being encoded by the delta technique would allow errors to be purged at least every Nth line. Such errors, therefore, would only exist for the lines in between those passed as straight information from the facsimile transmitter to the binary encoder. Such errors, therefore, could not be propagated throughout the entire length of a document because of the reinstitution of the delta encoding method every Nth line.

In accordance with a second embodiment of the disclosed invention, successive subinterval portions of successive scan lines would be sent as raw information while the rest of the line would be sent encoded by the delta encoding technique. Such method also purges the transmission errors at least every Nth line because of the successive transmissions of the raw information. Depending upon the number of scans per unit length, the choice of the number of lines to be encoded in the delta encoder, as in the first embodiment, or the portions of a line to be encoded, as in the second embodiment, would determine such parameters.

For a more complete understanding of the invention, as well as other objects and further features thereof, reference may be had to the following detailed description in conjunction with the drawings wherein.

Figures 1, 3:
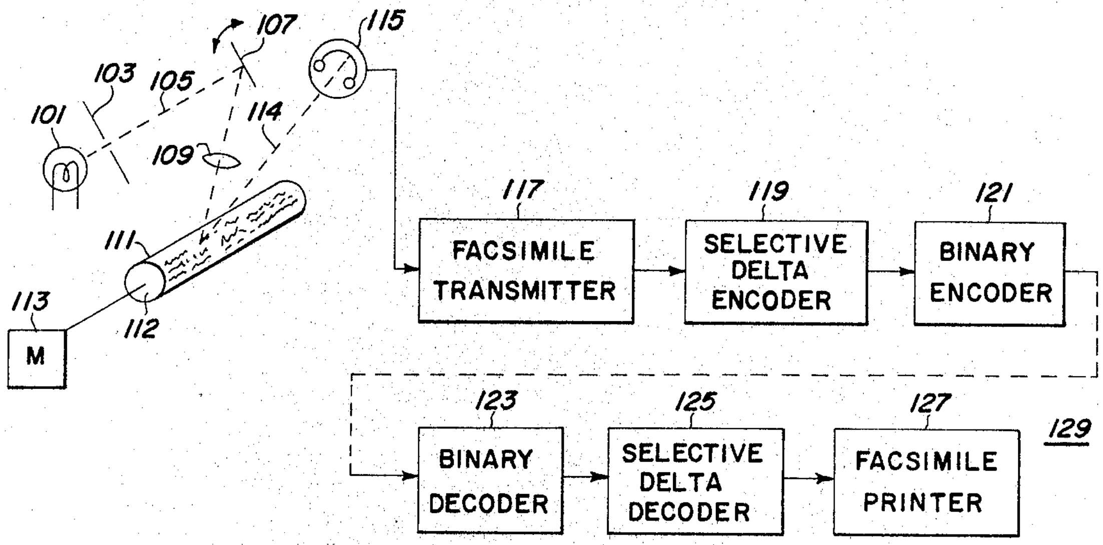
FIG. 1 is a block diagram of a facsimile system embodying the principles of the present invention.
FIG. 3 is a representative diagram of five scan lines on a document useful in understanding various aspects of one embodiment of the present invention.

Referring now to FIG. 1, there is shown a facsimile system embodying the principles of the present invention. A lamp 101 is provided to emit a beam of light rays 105 which by means of the slit in card 103 is colimated into a fine beam. The beam of light is arranged to be selectively deflected across the face of a document 111 by means of rotatably supported mirror 107. The document 111 is mounted on a support drum 112, by any means known in the art, and is selectively advanced by motor 113. The information modulated reflected light beam 114 impinges upon a photosensitive device, such as a photomultiplier tube 115. The output from phototube 115 is a series of electrical pulses representative of the information detected from document 111. The output from the phototube 115 is coupled to the input of the facsimile transmitter circuitry 117, which includes the normal facsimile circuitry as synchronization circuits, time base circuits, and time quantizing circuits which convert the analog information signals to a digital output signal. The selective delta encoder 119, coupled to the output of facsimile transmitter 117, receives the electrical video signals and by operation therein, which will hereinafter be more fully described, increases the effective run length of the white information. Such information is then encoded in binary encoder 121 to reduce the redundancy of such white information to a binary bit waveform of decreased information bit length. Such information is then transmitted to a facsimile receiver 129 by any means known in the art.

Binary decoder 123 decompresses the binary bit waveform into the original signal bit length as that present in the facsimile transmitter. The output from the binary decoder is coupled to the selective delta decoder 125, which, as will hereinafter be more fully described, reconstructs the original signal information waveform from the encoded signal. The original signal information, as representative of the information on document 111, is applied to facsimile printer 127 for the creation of a facsimile of the original document.

Figure 2:
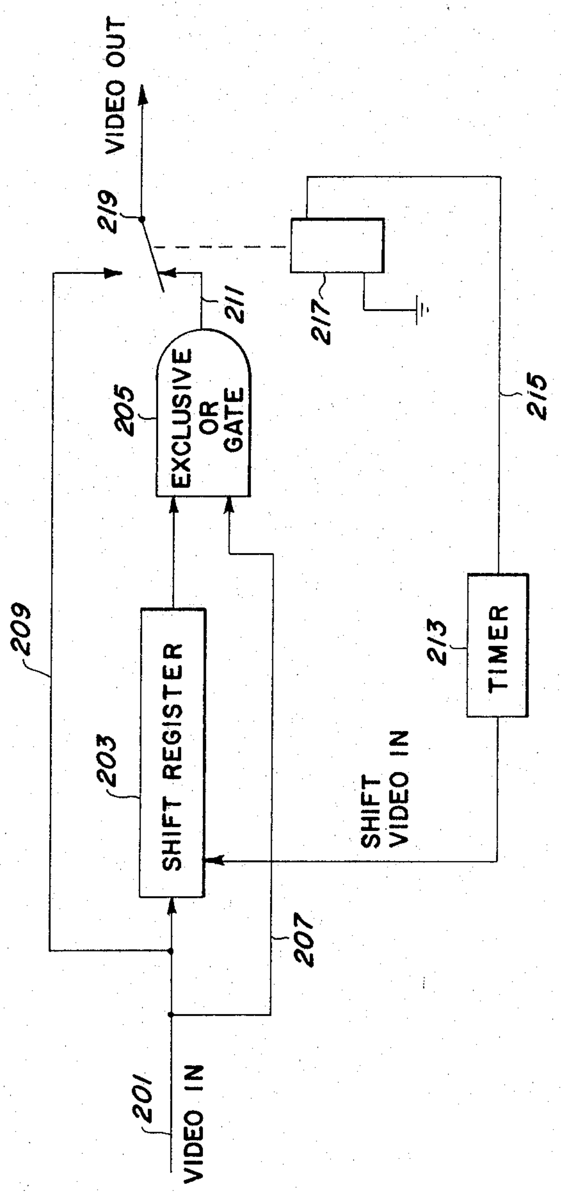
FIG. 2 is a block diagram of the selective delta encoder in accordance with the principles of the present invention.

FIG. 2 is a simplified block diagram of the selective delta encoder 119 illustrated in FIG. 1. The binary data input on line 201, representing successive bits from one line of information, is serially applied to the input of N stage memory 203. The same input information is also available bit by bit on line 209 at one contact of relay 217 and at the input of exclusive—OR gate 205 over line 207. Timer 213 generates a timing signal having a predetermined time interval upon which relay 217 will be energized or deenergized over line 215. With the arm 219 of relay 217 in the position shown, the output of exclusive—OR gate 205 is coupled to the video output line of the encoder. Thus, when the next line information data on line 201 is fed to memory 203, the data stored therein from the previous line will be shifted out bit by bit as the new video data is shifted serially into the memory. As the first bit of the previous line data appears at the output of memory 203 and thus a first input to exclusive—OR gate 205, the first bit from the second line will also be appearing at the other input of gate 205. By operation of the gate 205, for example, if the output bit from the memory is a binary "1" or black bit and the first bit from the second line is a binary "1" or a black bit, then the output on line 211 will be a binary "0" indicating that the two bits have been compared and that they are the same. If, for example, the first input bit from the second scan line of information is a binary "1" indicating black information while the first binary bit in the stored memory 203 is a binary "0" or white information, then by operation of the exclusive—OR gate 205 the output on line 211 would be a binary "1" indicating that the two bits have been compared and they are not the same.

In accordance with the invention, certain information, on a selective basis, will be sent through without modification in the delta encoder such that the effects of noise errors will be purged in a cyclic basis. In the preceding paragraph, the timer 213 energized relay 217 to allow arm 219 to be coupled to the output of exclusive-OR gate 205. Every Nth line or portions thereof, timer 213 will release relay 217 to allow arm 219 to contact the terminal of line 209. Thus, the information input will be allowed to pass through to the output line without operation by memory 203 or the exclusive—OR gate 205. Subsequent lines can still be compared to such line, however, as the input information is still pulsed and stored in memory 203 even though no comparison is made with it. The delta encoder 119 thus compares one line of video information with the preceding line of video information and only the difference therein is passed to the output line. By operation of timer 213, selective portions of the video information can be passed out without operation or comparison. The other output from the timer is the shift pulse to the shift register 203.

In one embodiment of the invention, the timer 213 in FIG. 2 operates so as to allow selective discrete lines of information to be passed as raw information without encoding. For instance, every fifth line could be allowed to be passed without encoding thereof, which means that at every fifth line the effect of noise or scan errors will be purged while still utilizing the advantages of a delta encoder.

In accordance with a second embodiment utilizing the principles of the present invention, successive discrete portions of successive lines may be passed as raw information without encoding by the delta encoder. That is, various subintervals of a line may be transmitted without modification by the delta encoding technique. Referring now to FIG. 3, there is shown an exemplary embodiment, wherein for line A the first quarter would be allowed to pass as raw video information without modification by the delta encoder, while quarters two, three and four would be encoded by the encoder. In line B, the first quarter is now encoded by the encoder along with quarters three and four; however, quarter two is now passed as raw information. This sequence continues with quarters three and four in lines C and D, respectively, being sent as raw information without operation in the encoder. Line E begins the sequence again with quarter number one being sent as raw information. The effects of the streaking errors are therefore successively purged from the information waveform by the successive transmission of subintervals of the lines as raw information. For purposes of example, FIG. 3 utilizes lines divided into subinterval quarters and every fifth line starting the sequence again; but it is apparent that any line division could be utilized while still retaining the advantages of the principles of the present invention.

Figure 4:
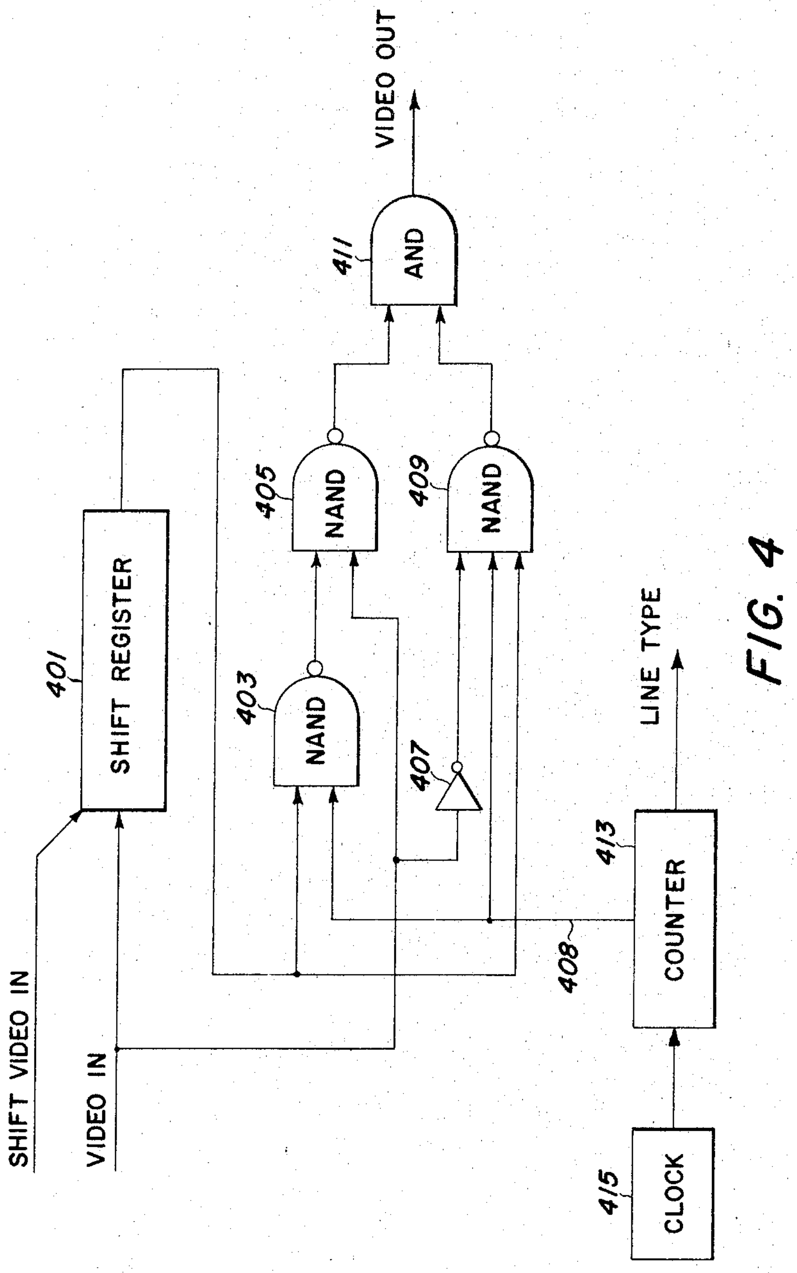
FIG. 4 is a detailed illustration of the selective delta encoder in accordance with the principles of the present invention.

Referring now to FIG. 4, there is shown a logical diagram for a delta encoder utilizing the principles of the present invention. The video input for one complete scan line of information is shifted into shift register 401. Shift register 401 may comprise a plurality of logic flip-flop circuits cascaded to store the required number of bits for one complete line. A typical facsimile scan line may comprise 1152 bits; thus, the shift register 401 would be designed to store serially 1152 bits. At the same time that the input video is shifted into the shift register 401, the information is also present as an input to NAND gate 405, and NAND gate 409 by means of inverter 407. A NAND gate, as utilized herein, is a conventional AND gate followed by an inverter. It will have logic "0" output only when all its input variables are logic "1." The output from shift register 401 is coupled to the inputs of NAND gate 403 and NAND gate 409. The second input to NAND gate 403 and the third input to NAND gate 409 is one signal output from counter 413. The other input to NAND gate 405 is the output from NAND gate 403. The inputs to AND gate 411 are coupled to the output of NAND gates 405 and 409. The output from AND gate 411 is the video output from the delta encoder utilizing the principles of the present invention.

Clock source 415 has its output coupled to the input of counter 413, which will count to a predetermined number and then generate an output control signal which selectively gates the inputs of NAND gates 403 and 409 so as to control the gating system to encode the video information by the disclosed delta technique. The other output from counter 413 is a line type signal to be sent to the receiver to indicate to the delta decoder the condition of the input line being received.

In operation, the delta encoder will receive the lines of input video data bit by bit from the facsimile scanner at shift register 401. At the same time, such input video is present at NAND gate 405 and the inverse at the input of NAND gate 409. If, for example, the incoming line is to be the one line out of five to be passed without being encoded, the output from counter 413 on line 408 will be in the logic "0" state. In addition, this signifies a nondelta line on the line type output from the counter 413. Such a binary logic "0" state forces the outputs of NAND gates 403 and 409 to the logic "1" state. Since the output of NAND gate 409 is held at logic "1" state when line 408 is at the logic "0" state, the output of AND gate 411 can only go to logic "0" if the output of NAND gate 405 goes to logic "0". This only occurs if the incoming video signal is at the logic "1" state, so, for a nondelta condition, NAND gate 405 simply inverts the incoming line of information and delivers it to the output.

When the incoming line is to be encoded in the delta technique, counter 413 will pulse line 408 and be at, for example, the logic "1" state, signifying a delta encoded line. This condition now unblocks NAND gates 403 and 409 and allows gates 403, 405, and 409 to operate as an exclusive—OR gate with inputs from the shift register and the input video line. When the Nth bit of a line is present on the video-in line, the Nth bit of the previous line is present at the shift register 401 output. The exclusive—OR gate thus compares the two bits, and gives a "0" bit indication at the output of AND gate 411 only if the two bits differ. Thus, at the output of this delta encoder, "0" indicates changes and "1" no change.

Therefore, this logic performs the delta encoding function if line 408 is at the logic "1" state, and passes the incoming data unchanged, except for an inversion, if line 408 is at the logic "0" state. The number of encoded-to-encoded lines and portions thereof can be changed by simply altering the counter to give a different output count.

Figure 5:
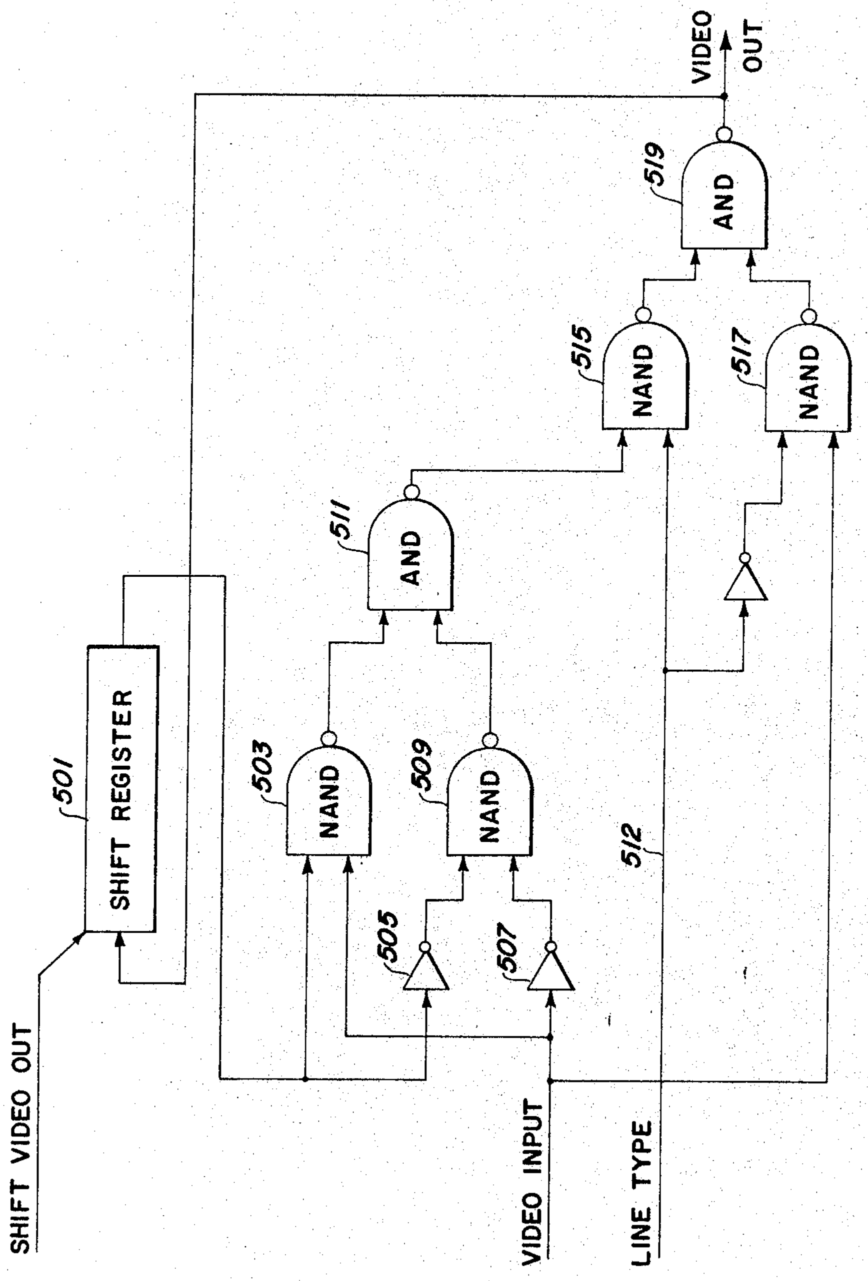
FIG. 5 is a detailed illustration of the delta decoder in accordance with the principles of the present invention.

Referring now to FIG. 5, there is shown a logic diagram of a delta decoder, compatible with the encoder in FIG. 4, utilizing the principles of the present invention. The video information input to the decoder is present at NAND gates 503 and 517 as well as NAND gate 509 inverted by means of inverter 507. The line type signal, denoting the presence of delta or nondelta information, is an input to NAND gate 515, and NAND gate 517 by means of inverter 513. The outputs from NAND gates 515 and 517 are coupled to the input of OR gate 519. The output from OR gate 519 is the video output line to the printer and is also rerouted to the input of shift register 501. Coupled to the shift register 501 is a shift video out signal train which by any known method is synchronized with the shift video signal at the transmitter to pulse the shift register information along the output line. The output from shift register 501 is the other input to NAND gate 503 and by means of inverter 505 is the other input to NAND gate 509. The outputs from NAND gates 503 and 509 are coupled to the input of AND gate 511 which has its output coupled to the input of NAND gate 515.

In operation of the delta decoder in accordance with the principles of the present invention, the video information received will be an input to NAND gate 503, to inverter 507, and to NAND gate 517. If the line type signal, as received from the transmitter or by a similar counter at the receiver, is in the logic "0" state, indicating a nondelta line being received, NAND gate 515 is blocked and NAND gate 517 unblocked such that it inverts the incoming video data and delivers it to the output line through AND gate 519 as video information to be printed at the facsimile printer.

If the line type signal is at the logic "1" state, indicating that a delta line is being received, NAND gate 517 is blocked and NAND gate 515 is unblocked, allowing the output of AND gate 511 to be inverted and delivered as video data at the output. At the Nth bit time in the line, the output of AND gate 511 will depend upon the Nth bit from the previous line, now present at the output of the shift register 501, and the incoming data. If the incoming data is at the logic "0" state, the Nth bit of the present line would differ from that of the previous line. If the input line is at the logic "1" state, both Nth bits should be the same. This switching function is accomplished by gates 503, 509 and 511, with inverters 505 and 507. For an input at the logic "0" state, NAND gate 503 is blocked and NAND gate 509 is unblocked, allowing the shift register output to appear at the output of OR gate 511. If the input is at a logic "1" state, gate 509 is blocked and gate 503 is unblocked, allowing the inverted shift register output to appear at the output of AND gate 511. Thus, a nondelta line is passed with only an inversion by this logic, while a delta line generates video by comparison with the previous line stored in the shift register 501.

In FIGS. 4 and 5 it has been assumed for purposes of example that an entire line or lines is to be transmitted without delta encoding out of a total amount of lines.

This function is related to the counter 413 in the encoder and the line type output from the counter. However, the embodiment in FIG. 3 may also be implemented in FIGS. 4 and 5 by altering the count of counter 413 before an entire line has been shifted. Thus, in FIG. 3, where only quarters of a line are sent as raw information and the rest of the line as delta encoded information, changing the counting rate in the counter will energize those NAND gates necessary for allowing the raw information to pass through at one time and to delta encode the information at succeeding times.

In the foregoing, there has thus been disclosed methods and apparatus for optimizing the utilization of the bandwidth capabilities of a transmission link in a facsimile transmission system by a nonstreaking delta encoding technique. While the embodiments have been described for an inversion of the data signal at the output, as has hereinbefore been discussed, such an inversion is for expedience only and not a requirement for optimum system operation. Other logic components may be utilized for a noninversion condition without violating the principles of the present invention. In addition, logic NAND and OR gate circuitry has been disclosed and described; however, it is apparent that other logic circuitry could be designed by one skilled in the art to perform the same functions.

It will be realized by those skilled in the are that the lines or parts of lines which are passed without delta encoding require the full bandwidth for transmission through the facsimile system. Bandwidth compression can be obtained by storing the unencoded information for transmission at a slower rate, or by scanning the unencoded lines at a reduced rate. Either arrangement may be used without affecting the princples of the streak-limiting delta encoding method described above.

Thus, while the present invention, as to its objects and advantages, as described herein, has been set forth in specific embodiments thereof, they are to be understood to be illustrative only and not to be limiting. It is applicants' intention, therefore, to be limited only as indicated by the scope of the appended claims.

What is claimed is:

1. In a graphic communication system, the combination comprising:
- means for generating a source of image exploring rays,
- means for focusing said image exploring rays to form an exploring beam of light of predetermined size,
- means for projecting the exploring beam of light onto a document to be explored in a raster type sweep scan,
- means for imparting relative translatory motion between said beam of light and said document to be explored,
- means for detecting the information modulated reflected light rays from said document,
- quantizing means coupled to said detecting means for generating video binary waveforms representative of successive scan lines of information,
- delta encoding means for selectively comparing corresponding bits in a binary waveform with the immediately preceding binary waveform,

- switch means for selectively enabling and disabling said delta encoding means,
- timing means coupled to said switch means for generating a signal of predetermined interval, whereby selected portions of said binary waveform are transferred as raw video binary information so as to limit the streaking effect of signal errors,
- binary encoding means coupled to the output from said delta encoding means for reducing the signal redundancy in the output signal therefrom, and
- transmitting means for transmitting said binary encoded signal to a facsimile receiver.

2. The combination as defined in claim 1 wherein the fascimile receiver comprises:
- binary decoding means for reconstructing the output signal waveform,
- delta decoding means for selectively comparing bit by bit a binary waveform with the next binary waveform to reconstruct the original video binary waveform,
- switch means for selectively enabling and disabling said delta decoding means,
- second timing means in synchronization with said first mentioned timing means for controlling the selective actuation of said switch means, whereby selective positions of said binary waveform are transferred as raw video information so as to limit the streaking effect of signal errors, and
- printer means for creating a facsimile of said document.

3. The combination as defined in claim 1 wherein said timing means actuates said switching means every Nth scan line of information to transfer the binary waveform representing the Nth scan line detected information as raw video information such that the delta encoding means is interrupted cyclically.

4. The combination as defined in claim 1 wherein said timing means actuates said switching means every Nth scan segment of information to transfer successive subinterval portions of successive scan lines of information as raw video information such that the delta encoding means is interrupted cyclically.

References Cited

UNITED STATES PATENTS

| | | | |
|---|---|---|---|
| 2,946,851 | 9/1960 | Kretzmer | 179—15.55 |
| 2,951,899 | 9/1960 | Day. | |
| 3,071,727 | 1/1963 | Kitsopoulos | 325—38.1 |
| 2,949,505 | 8/1960 | Kretzmer | 325—38 |
| 3,383,461 | 5/1968 | Dryden | 325—38.1 |
| 3,423,526 | 1/1969 | Law | 325—38 |

OTHER REFERENCES

Barnette, W. E. and Olive, G. A.: Bandwidth Reduction for TV, RCA Technical Notes—RCA TN No. 152—Aug. 18, 1958.

ROBERT L. GRIFFIN, Primary Examiner

J. A. ORSINO, Jr., Assistant Examiner

U.S. Cl. X.R.

325—38